(12) United States Patent
Scott

(10) Patent No.: US 7,068,822 B2
(45) Date of Patent: Jun. 27, 2006

(54) SYSTEM AND METHOD FOR SENDING A PACKET WITH POSITION ADDRESS AND LINE SCAN DATA OVER AN INTERFACE CABLE

(75) Inventor: Walter G Scott, North Palm Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/321,548

(22) Filed: Dec. 18, 2002

(65) Prior Publication Data

US 2003/0123716 A1 Jul. 3, 2003

Related U.S. Application Data

(63) Continuation of application No. 09/425,949, filed on Oct. 25, 1999, now abandoned.

(60) Provisional application No. 60/147,498, filed on Aug. 9, 1999.

(51) Int. Cl.
*G06K 9/00* (2006.01)

(52) U.S. Cl. ............... 382/124; 382/125; 382/126; 382/127

(58) Field of Classification Search ............ 586/115, 586/116, 119–127
See application file for complete search history.

(56) References Cited

U.S. PATENT DOCUMENTS

| | | | |
|---|---|---|---|
| 2,500,017 A | 3/1950 | Altman | 88/57 |
| 3,200,701 A | 8/1965 | White | 88/14 |
| 3,482,498 A | 12/1969 | Becker | 95/12 |
| 3,527,535 A | 9/1970 | Monroe | 356/71 |
| 3,617,120 A | 11/1971 | Roka | 353/28 |
| 3,699,519 A | 10/1972 | Campbell | 340/146.3 E |
| 3,824,951 A * | 7/1974 | Le Vantine et al. | 118/31.5 |
| 3,947,128 A | 3/1976 | Weinberger et al. | 356/71 |
| 3,968,476 A | 7/1976 | McMahon | 340/146.3 E |
| 4,032,975 A | 6/1977 | Malueg et al. | 358/213 |
| 4,063,226 A | 12/1977 | Kozma et al. | 365/125 |
| 4,210,899 A | 7/1980 | Swonger et al. | 340/146.3 E |
| 4,414,684 A | 11/1983 | Blonder | 382/4 |
| 4,537,484 A | 8/1985 | Fowler et al. | 354/62 |
| 4,544,267 A | 10/1985 | Schiller | 356/71 |

(Continued)

FOREIGN PATENT DOCUMENTS

EP 0 101 772 A1 3/1984

(Continued)

OTHER PUBLICATIONS

Btt (Biometric Technology Today), Finger technologies contacts, 2 pages.

(Continued)

*Primary Examiner*—Samir Ahmed
*Assistant Examiner*—Brian Le
(74) *Attorney, Agent, or Firm*—Sterne Kessler Goldstein Fox PLLC

(57) ABSTRACT

A system and method for sending a packet with a position address and line scan data from a first device over a 1394 interface to a second device. The present invention loads a camera, an illuminator, and a microprocessor with set-up instructions and a start pulse. The camera captures a line-by-line image of an object placed on the surface of a sliding prism. Position data, corresponding to the captured line-by-line image, is logged as the position address. The position address is combined with the line-by-line image to form a packet. The packet is sent to the second device for processing and viewing the image.

20 Claims, 4 Drawing Sheets

U.S. PATENT DOCUMENTS

| | | | | |
|---|---|---|---|---|
| 4,601,195 A | | 7/1986 | Garritano | 73/60 |
| 4,681,435 A | | 7/1987 | Kubota et al. | 356/71 |
| 4,747,147 A | * | 5/1988 | Sparrow | 382/125 |
| 4,783,823 A | | 11/1988 | Tasaki et al. | 382/4 |
| 4,784,484 A | | 11/1988 | Jensen | 356/71 |
| 4,792,226 A | | 12/1988 | Fishbine et al. | 356/71 |
| 4,811,414 A | | 3/1989 | Fishbine et al. | 382/52 |
| 4,817,183 A | * | 3/1989 | Sparrow | 382/125 |
| 4,876,726 A | | 10/1989 | Capello et al. | 382/4 |
| 4,924,085 A | | 5/1990 | Kato et al. | 250/227.28 |
| 4,933,976 A | | 6/1990 | Fishbine et al. | 382/4 |
| 4,995,086 A | | 2/1991 | Lilley et al. | 382/4 |
| 5,054,090 A | | 10/1991 | Knight et al. | 382/4 |
| 5,067,162 A | | 11/1991 | Driscoll, Jr. et al. | 382/5 |
| 5,067,749 A | | 11/1991 | Land | 283/117 |
| 5,131,038 A | | 7/1992 | Puhl et al. | 380/23 |
| 5,146,102 A | | 9/1992 | Higuchi et al. | 250/556 |
| 5,187,747 A | | 2/1993 | Capello et al. | 382/4 |
| 5,222,152 A | | 6/1993 | Fishbine et al. | 382/2 |
| 5,230,025 A | | 7/1993 | Fishbine et al. | 382/4 |
| 5,233,404 A | | 8/1993 | Lougheed et al. | 356/71 |
| 5,249,370 A | | 10/1993 | Stanger et al. | 34/22 |
| D348,445 S | | 7/1994 | Fishbine et al. | D14/107 |
| D351,144 S | | 10/1994 | Fishbine et al. | D14/107 |
| 5,384,621 A | | 1/1995 | Hatch et al. | 355/204 |
| 5,412,463 A | | 5/1995 | Sibbald et al. | 356/71 |
| 5,416,573 A | | 5/1995 | Sartor, Jr. | 356/71 |
| 5,467,403 A | | 11/1995 | Fishbine et al. | 382/116 |
| 5,469,506 A | | 11/1995 | Berson et al. | 380/23 |
| 5,473,144 A | | 12/1995 | Mathurin, Jr. | 235/380 |
| 5,509,083 A | | 4/1996 | Abtahi et al. | 382/124 |
| 5,517,528 A | | 5/1996 | Johnson | 375/259 |
| 5,528,355 A | | 6/1996 | Maase et al. | 356/71 |
| 5,548,394 A | | 8/1996 | Giles et al. | 356/71 |
| 5,591,949 A | | 1/1997 | Bernstein | 235/380 |
| 5,596,454 A | | 1/1997 | Hebert | 359/726 |
| 5,598,474 A | | 1/1997 | Johnson | 380/23 |
| 5,613,014 A | | 3/1997 | Eshera et al. | 382/124 |
| 5,615,277 A | | 3/1997 | Hoffman | 382/115 |
| 5,625,448 A | | 4/1997 | Ranalli et al. | 356/71 |
| 5,640,422 A | | 6/1997 | Johnson | 375/259 |
| 5,649,128 A | | 7/1997 | Hartley | 395/309 |
| 5,650,842 A | | 7/1997 | Maase et al. | 356/71 |
| 5,661,451 A | | 8/1997 | Pollag | 340/426 |
| 5,680,205 A | | 10/1997 | Borza | 356/71 |
| 5,689,529 A | | 11/1997 | Johnson | 375/259 |
| 5,717,777 A | | 2/1998 | Wong et al. | 382/124 |
| 5,745,684 A | | 4/1998 | Oskouy et al. | 395/200.8 |
| 5,748,766 A | | 5/1998 | Maase et al. | 382/124 |
| 5,755,748 A | | 5/1998 | Borza | 607/61 |
| 5,778,089 A | | 7/1998 | Borza | 382/124 |
| 5,781,647 A | | 7/1998 | Fishbine et al. | 382/1 |
| 5,793,218 A | | 8/1998 | Oster et al. | 324/754 |
| 5,805,777 A | | 9/1998 | Kuchta | 395/112 |
| 5,812,067 A | | 9/1998 | Bergholz et al. | 340/825.31 |
| 5,815,252 A | | 9/1998 | Price-Francis | 356/71 |
| 5,818,956 A | | 10/1998 | Tuli | 382/126 |
| 5,822,445 A | | 10/1998 | Wong | 382/127 |
| 5,825,005 A | | 10/1998 | Behnke | 235/380 |
| 5,825,474 A | | 10/1998 | Maase | 356/71 |
| 5,828,773 A | | 10/1998 | Setlak et al. | 382/126 |
| 5,832,244 A | | 11/1998 | Jolley et al. | 395/309 |
| 5,848,231 A | | 12/1998 | Teitelbaum et al. | 395/186 |
| 5,859,420 A | | 1/1999 | Borza | 250/208.1 |
| 5,859,710 A | | 1/1999 | Hannah | 358/296 |
| 5,862,247 A | | 1/1999 | Fisun et al. | 382/116 |
| 5,867,802 A | | 2/1999 | Borza | 701/35 |
| 5,869,822 A | | 2/1999 | Meadows, II et al. | 235/380 |
| 5,872,834 A | | 2/1999 | Teitelbaum | 379/93.03 |
| 5,900,993 A | | 5/1999 | Betensky | 359/710 |
| 5,907,627 A | | 5/1999 | Borza | 382/124 |
| 5,920,384 A | | 7/1999 | Borza | 356/71 |
| 5,920,640 A | | 7/1999 | Salatino et al. | 382/124 |
| 5,928,347 A | | 7/1999 | Jones | 710/129 |
| 5,942,761 A | * | 8/1999 | Tuli | 250/556 |
| 5,948,080 A | * | 9/1999 | Baker | 710/37 |
| 5,960,100 A | | 9/1999 | Hargrove | 382/124 |
| 5,973,731 A | | 10/1999 | Schwab | 348/161 |
| 5,974,162 A | | 10/1999 | Metz et al. | 382/124 |
| 5,978,495 A | * | 11/1999 | Thomopoulos et al. | 382/124 |
| 5,987,155 A | | 11/1999 | Dunn et al. | 382/116 |
| 5,995,014 A | | 11/1999 | DiMaria | 340/825.31 |
| 6,018,739 A | | 1/2000 | McCoy et al. | 707/102 |
| 6,018,816 A | * | 1/2000 | Tateyama | 714/746 |
| 6,023,522 A | | 2/2000 | Draganoff et al. | 382/124 |
| 6,041,372 A | | 3/2000 | Hart et al. | 710/62 |
| 6,075,876 A | | 6/2000 | Draganoff | 382/124 |
| 6,078,265 A | | 6/2000 | Bonder et al. | 340/825.31 |
| 6,088,585 A | | 7/2000 | Schmitt et al. | 455/411 |
| 6,104,809 A | | 8/2000 | Berson et al. | 380/23 |
| 6,160,796 A | * | 12/2000 | Zou | 370/257 |
| 6,175,407 B1 | * | 1/2001 | Sartor | 356/71 |
| 6,178,255 B1 | * | 1/2001 | Scott et al. | 382/124 |
| 6,243,783 B1 | * | 6/2001 | Smyers et al. | 710/310 |
| 6,292,890 B1 | * | 9/2001 | Crisan | 713/2 |
| 6,333,938 B1 | * | 12/2001 | Baker | 370/503 |

FOREIGN PATENT DOCUMENTS

| | | |
|---|---|---|
| EP | 0 308 162 A2 | 3/1989 |
| EP | 0 308 162 A3 | 3/1989 |
| EP | 0 379 333 A1 | 7/1990 |
| EP | 0 623 890 A2 | 11/1994 |
| EP | 0 623 890 A3 | 11/1994 |
| EP | 0 379 333 B1 | 7/1995 |
| EP | 0 889 432 A2 | 1/1999 |
| EP | 0 889 432 A3 | 1/1999 |
| EP | 0 905 646 A1 | 3/1999 |
| EP | 0 924 656 A2 | 6/1999 |
| GB | 2 089 545 A | 6/1982 |
| GB | 2 313 441 A | 11/1997 |
| WO | WO 87/02491 A1 | 4/1987 |
| WO | WO 90/03620 A1 | 4/1990 |
| WO | WO 92/11608 A1 | 7/1992 |
| WO | WO 94/22371 A2 | 10/1994 |
| WO | WO 94/22371 A3 | 10/1994 |
| WO | WO 96/17480 A2 | 6/1996 |
| WO | WO 96/17480 A3 | 6/1996 |
| WO | WO 97/29477 A1 | 8/1997 |
| WO | WO 97/41528 A1 | 11/1997 |
| WO | WO 98/09246 A1 | 3/1998 |
| WO | WO 98/12670 A1 | 3/1998 |
| WO | WO 99/12123 A1 | 3/1999 |
| WO | WO 99/26187 A1 | 5/1999 |
| WO | WO 99/40535 A1 | 8/1999 |

OTHER PUBLICATIONS

Drake, M.D. et al., "Waveguide hologram fingerprint entry device," *Optical Engineering*, vol. 35, No. 9, Sep. 1996, pp. 2499-2505.

Roethenbaugh, G. (ed.), *Biometrics Explained*, 1998, ICSA, pp. 1-34.

*Automated Identification Systems* (visited May 20, 1999) <http://www.trw.com/idsystems/bldgaccess2.html>, 1 page, Copyright 1999.

*Ultra-Scan Corporation Home Page* (visited May 20, 1999) <http://www.ultra-scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID-Card System Technical Specifications* (last updated Jul. 18, 1998) <http://dermalog.de/Britain/Products/ID-Card/idcard2.htm>, 2 pages.
*Fujitsu Limited Products and Services* (updated Apr. 21, 1999) <http://www.fujitsu.co.jp/hypertext/Products/index-e.html>, 3 pages, Copyright 1995-1999.
*SonyDCam* (visited May 20, 1999) <http://www.microsoft.com/DDK/ddkdocs/Win2k/sonydcam.htm>, 3 pages, Copyright 1999.
*Verid Fingerprint Verification* (visited May 17, 1999) <http://www.tssi.co.uk/products/finger.html>, 2 pages.
*Startek's Fingerprint Verification Products: Fingerguard FG-40* (visited May 18, 1999) <http://www.startek.com.tw/product/fg40/fg40.html>, 3 pages.
*SAC Technologies Showcases Stand-Alone SAC-Remote (TM)* (visited May 18, 1999) <http://www.pathfinder.com/money/latest/press/PW/1998Mar25/1026.html>, 2 pages.
"Biometrics, The Future Is Now," *securitymagazine*, May 1999, pp. 25-26.
*Mytec Technologies Gateway*, (visited Apr. 27, 1999) <http://www.mytec.com/Products/gateway/>, 1 page.
*Mytec Technologies Gateway: Features & Benefits*, (visited Apr. 27, 1999) <http://www.mytec.com/Products/gateway/features.htm>, 1 page.
*Mytec Technologies Touchstone Pro*, (visited Apr. 27, 1999) <http://www.mytec.com/Products/Touchstone/>, 1 page.
*Mytec Technologies Touchstone Pro: Features*, (visited Apr. 27, 1999) <http://www.mytec.com/Products/Touchstone/features.htm>, 1 page.
*Electronic Timeclock Systems and Biometric Readers* (last updated Apr. 17, 1999) <http://www.lfs-hr-bene.com/tclocks.html>, 1 page.
*Fingerprint Time Clock* (visited May 17, 1999) <http://www.lfs-hr-bene.com/Biometrics/Fingerprintclock.html>, 6 pages.
*KC-901: The KSI fingerprint sensor* (visited May 17, 1999) <http://www.kinetic.bc.ca/kc-901.html>, 3 pages.
*INTELNET Inc.* (visited May 20, 1999) <http://www.intelgate.com/index.html>, 1 page, Copyright 1996.
*Ver-i-Fus Fingerprint Access Control System* (visted May 20, 1999) <http://www.intelgate.com/verifus.htm>, 2 pages. (Ver-i-fus product released in 1995).
*Ver-i-fus® Configurations* (visited May 20, 1999) <http://www.intelgate.com/verconfig.htm>, 1 page. (Ver-i-fus product released in 1995).
*Ver-i-Fus®& Ver-i-Fus$^{mil}$®* (visited May 20, 1999) <http://www.intelgate.com/vif_data.htm>, 3 pages. (Ver-i-fus product released in 1995).
*Access Control System Configurations* (visited May 20, 1999) <http://www.intelgate.com/access.htm>, 2 pages. (Ver-i-fus product released in 1995).
*Company* (visited May 17, 1999) <http://www.instainfo.com.company.htm>, 2 pages.
*TouchLock™ II Fingerprint Identity Verification Terminal* (visited May 17, 1999) <http://www.indentix.com/TLock.htm>, 4 pages.
*Physical Security and Staff Tracking Solutions* (visited May 17, 1999) <http://www.indentix.com/products/biosecurity.html>, 3 pages, Copyright 1996-1998.
*Veriprint2000 Fingerprint Verification Terminal For Use With Jantek Time & Attendance Software* (visited May 17, 1999) <http://www.hunterequipment.com/fingerprint.htm>, 2 pages.

*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
*Veriprint 2100 Stand-Alone Fingerprint Verification Terminal* (visited Apr. 27, 1999) <http://www.biometricid.com/veriprint2100.htm>, 3 pages.
Randall, N., "A Serial Bus on Speed," *PC Magazine*, May 25, 1999, pp. 201-203.
*The DERMALOG Check-ID* (visited Nov. 12, 1999) <http://www.dermalog.de/ganzneu/products_check.html>, 1 page.
*Check-ID Specifications and Features* (visited Nov. 12, 1999) <http://www.dermalog.de/ganzneu/spec_check.html>, 1 page, Copyright 1999.
*Startek's Fingerprint Verification Products: FingerFile 1050* (visited Oct. 8, 1999) <http://www.startek.com.tw/product/ff1050/ff1050.html>, 3 pages.
*Time is Money!* (visited Jun. 5, 1998) <http://www.iaus.com/afim.htm>, 3 pages.
*LS 1 LiveScan Booking Workstation High Performance Finger & Palm Scanning System* (visited Jun. 4, 1998) <http://www.hbs-jena.com/lsl.htm>, 6 pages, Copyright 1998.
*Welcome to the Homepage of Heimann Biometric Systems GMBH* (visited Jun. 4, 1998) <http://www.hbs-jena.com/>, 1 page. Copyright 1998.
*Heimann Biometric Systems Corporate Overview* (visited Jun. 4, 1998) <http://www.hbs-jena.com/company.htm>, 4 pages, Copyright 1998.
*Remote Access Positive IDentification—raPID* (visited Jun. 3, 1998) <http://www.nec.com . . . >, 2 pages, Copyright 1997.
*Morpho DigiScan Cellular* (visited Jun. 3, 1998) <http://www.morpho.com/products/law_enforcement/digiscan/cellular.htm>, 2 pages, Copyright 1998.
*A.F.I.S.* (last updated Apr. 4, 1998) <http://www.dermalog.de/afis.htm>, 2 pages.
*Morpho FlexScan Workstation (visited Jun. 3, 1998) <http://www.morpho.com/products/law_enforcement/flexscan/>*, 2 pages, Copyright 1998.
True-ID® The LiveScan with special "ability" . . . , 2 pages.
*Printrak International: User List* (visited Jun. 3, 1998) <http://www.printrakinternational.com and links>, 10 pages, Copyright 1996.
*Live-Scan Products: Tenprinter® 1133S* (visited Apr. 23, 1999) <http://www.digitalbiometrics.com/Products/tenprinter.htm>, 4 pages. (Tenprinter 1133S released in 1996).
*TouchPrint™ 600 Live-Scan System* (visited Apr. 23, 1999) <http://www.identix.com/products/livescan.htm>, 4 pages, Copyright 1996-1998.
Systems for Live-Scan Fingerprinting, Digital Biometrics, Inc., 8 pages, Copyright 1998.
DBI FingerPrinter CMS, Digital Biometrics, Inc., 5 pages. (CMS released in 1998).
Fingerscan V20, Indentix Incorporated, 1 page, Copyright 1999.
Verid Fingerprint Reader, TSSI, 4 pages.
Response to Request for Information, Cross Match Technologies, Inc., 12 pages, Apr. 14, 1999.
*Startek's Fingerprint Verification Products* (visited Nov. 17, 1999) <http://www.startek.com.tw/product/index.html>, 1 page.

*Introduction to Startek's Fingerprint Verification Products* (visited Nov. 17, 1999) <http://www.startek.com.tw/product/index2.html>, 2 pages.

*Automatic Fingerprint Identification Systems* (visited Nov. 17, 1999) <http://www.sage.com/en/produit4-en/empreinte-dig-en.htm>, 1 page.

*Digital Biometrics Corporate Information* (visited Nov. 17, 1999) <http://digitalbiometrics.com/Corporate_info/Corporate_info.htm>, 2 pages. (discusses technology as early as 1985).

*DBI Live-Scan Products: Digital Biometrics TENPRINTER* (visited Nov. 17, 1999) <http://www.digitalbiometrics.com/products/tenprinter.htm>, 4 pages. (Tenprinter released in 1996).

*DBI Live-Scan Products: Networking Options* (visited Nov. 17, 1999) <http://www.digitalbiometrics.com/products/networking_options.htm>, 3 pages.

*DBI Live-Scan Products: Digital Biometrics FingerPrinter CMS* (visited Nov. 17, 1999) <http://www.digitalbiometrics.com/products/FingerPrinterCMS.htm>, 3 pages. (CMS released in 1998).

*DBI Live-Scan Products: Image Printer Stations* (visited Nov. 17, 1999) <http://www.digitalbiometrics.com/products/imageprinter.htm>, 2 pages.

*DBI Live-Scan Products: FC-21 Fingerprint Capture Station* (visited Nov. 17, 1999) <http://www.digitalbiometrics.com/products/Fingerprintcapture.htm>, 2 pages.

*Series 400 OEM Scanner* (visited Nov. 17, 1999) <http://www.ultra-scan.com/400.htm>, 3 pages. (Scanner released in 1996).

*USC Scanner Design* (visited Nov. 17, 1999) <http://www.ultra-scan.com/scanner.htm>, 4 pages. (Scanner released in 1996).

*Series 500/600 Scanners* (visited Nov. 17, 1999) <http://www.ultra-scan.com/500.htm>, 3 pages. (Scanner released in 1996).

*Series 700 ID Station* (visited Nov. 17, 1999) <http://www.ultra-scan.com/700.htm>, 3 pages. (Scanner released in 1998).

*Identix: The Corporation* (visited Nov. 17, 1999) <http://www.indetix.com/corporate/home.htm>, 2 pages, Copyright 1996-1998.

*Biometric Imaging Products* (visited Nov. 17, 1999) <http://www.indentix.com/products/bioimage.htm>, 1 page, Copyright 1996-1998.

*TouchPrint™ 600 Live-Scan System* (visited Nov. 17, 1999) <http://www.identix.com/products/livescan.htm>, 4 pages, Copyright 1996-1998.

*TouchPrint™600 Palm Scanner* (visited Nov. 17, 1999) <http://www.identix.com/products/palmscan.htm>, 3 pages, Copyright 1996-1998.

*TouchPrint™ 600 Card Scan System* (visited Nov. 17, 1999) <http://www.identix.com/products/cardscan.htm>, 3 pages, Copyright 1996-1998.

*Dermalog Key —The safest and easiest way of access control* (Last updated Jul. 18, 1998) <http://www.dermalog.de/Britain/Products/Key/key.htm>, 1 page.

*Dermalog Finger-ID Your small size solution for high security* (Last updated Jul. 18, 1998) <http://www.dermalog.de/Britain/Products/Finger/fingerid.htm>, 1 page.

*Mytec: Corporate* (visited Nov. 17, 1999) <http://www.metec.com/corporate/>, 2 pages.

*Kinetic Sciences Inc. Fingerprint Biometrics Division* (visited Nov. 17, 1999) <http://www.kinetic.bc.ca/main-FPB.html>, 1 page.

*Fingerprint Biometrics: Securing The Next Generation*, May 19, 1999, (visited Nov. 17, 1999) <http://www.secugen.com/pressrel.htm>, 2 pages.

*Secugen Unveils Fully Functional Fingerprint Recognition Solutions*, May 11, 1999, (visited Nov. 17, 1999) <http://www.secugen.com/pressrel.htm>, 3 pages.

*POLLEX Technology Ltd., The Expert in Fingerprint Identification—POLLog* (visited Nov. 17, 1999) <http://www.pollex.ch/english/products/pollog.htm>, 2 pages.

*Sony Fingerprint Identification Terminal* (visited Nov. 17, 1999) <http://www.iosoftware.com/biosols/sony/fiu/applications/fit100.htm>, 2 pages.

*Sony Fingerprint Identification Unit (FIU-700)* (visited Nov. 17, 1999) <http://www.iosoftware.com/biosols/sony/fiu70/index.htm>, 2 pages. (Unit available late 1999).

*Sony Fingerprint Identification Unit* (visited Nov. 17, 1999) <http://www.iosoftware.com/biosols/sony/fiu/index.htm>, 3 pages.

*Fujitsu Fingerprint Recognition Device (FPI-550)* (visited Nov. 17, 1999) <http://www.iosoftware.com/biosols/fujitsu/fpi550.htm>, 2 pages.

*Mitsubishi MyPass LP-1002* (visited Nov. 17, 1999) <http://www.iosoftware.com/biosols/mitsubishi/mypass.htm>, 2 pages.

*SecureTouch PV—A Personal Password Vault* (visited Nov. 17, 1999) <http://www.biometricaccess.com/securetouch_pv.htm>, 1 page.

*Digital Descriptor Systems, Inc.—Profile* (visited Nov. 17, 1990) <http://www.ddsi-cpc.com/pages/profile.html>, 3 pages.

*Press Release: Printrak International Announces New Portable Fingerprint ID Solution*, Dec. 10, 1996, (visited Nov. 17, 1999) >http://www.scott.net/~dg/25.htm>, 3 pages.

*Corporate Profile* (visited Nov. 17, 1999) <http://www.printrakinternational.com/corporate.htm>, 1 page.

*Printrak Products* (visited Nov. 17, 1999) <http://www.printrakinternational.com/Products.htm>, 1 page. (Discusses technology as early as 1974).

Verifier™ 200 Fingerprint Capture Devices, Cross Match Technologies, Inc., 2 pages, 1996-1997.

Verifier 200 Direct Fingerprint Reader, Cross Check Corporation, 2 pages, 1996-1997.

Verifier™ 250 Fingerprint Capture Devices, Cross Match Technologies, Inc., 2 pages, 1996-1997.

Verifier 250 Small Footprint Direct Fingerprint Reader, Cross Check Corporation, 2 pages, 1996-1997.

Verifier™ 290 Fingerprint Capture Devices, Cross Match Technologies, Inc., 2 pages, 1996-1997.

Verifier 290 Direct Rolled Fingerprint Reader, Cross Check Corporation, 2 pages, 1996-1997.

Verifier™ 500 Fingerprint Capture Devices, Cross Match Technologies, Inc., 2 pages, 1998.

Biometric terminal, 1 page.

10-Print Imaging System, Cross Check Corporation, 2 pages, 1998.

*Cross Match Technologies, Inc.* (visited Mar. 25, 1999) <http://www.crossmatch.net/>, 1 page.

*Cross Match Technologies, Inc.—Products Overview* (visited Mar. 25, 1999) <http://www.crossmatch.net/new/products/product-index.html>, 1 page.

*Cross Match Technologies, Inc.—Law Enforcement Systems* (visited Mar. 25, 1999) <http://www.crossmatch.net/new/law/law-index.html>, 2 pages.

*Cross Match Technologies, Inc.—Commercial Systems: Building On The Standard* (visited Mar. 25, 1999) <http:// www.crossmatch.net/new/commercial/commercial-index. html>, 2 pages.

*Cross Match Technologies, Inc.—International Sales* (visited Mar. 25, 1999) <http://www.crossmatch.net/new/sales/sales-index.html>, 1 page.

*Cross Match Technologies, Inc.—Support* (visited Mar. 25, 1999) <http://www.crossmatch.net/new/support/support-index.html>, 1 page.

*Cross Match Technologies, Inc.—News—Press Releases—Verifier 400 Press Release* (visited Mar. 25, 1999) <http://www.crossmatch.net/new/news/news-pr-050798.html>, 1 page.

*Global Security Fingerscan™ System Overview* (visited Jan. 11, 2000) <http://wwwu-net.com/mbp/sol/g/a9.htm>, 12 pages.

"Command Structure for a Low-Cost (Primitive) Film Scanner," *IBM Technical Disclosure Bulletin,* IBM Corp., vol. 35, No. 7, Dec. 1992, pp. 113-121.

*Fingerprint Scan API Toolkit Version 1.x Feature List* (April 26, 2000) <http://www.mentalix.com/api/archive_fapiv1.htm>, 3 pages.

"Image Aquisition System," *IBM Technical Disclosure Bulletin,* IBM Corp., vol. 29, No. 5, Oct. 1986, pp. 1928-1931.

Kunzman, Adam J. and Wetzel, Alan T., "1394 High Performance Serial Bus: The Digital Interface for ATV," *IEEE Transaction on Consumer Electronics,* IEEE, vol. 41, No. 3, Aug. 1995, pp. 893-900.

*Mentalix Provides The First IAFIS-Certified Latent Print Scanning Solution For Windows* (Jul. 23, 1999) <http://www.mentalix.com/pressreleases/fprintlook3_prel-.htm>, 2 pages.

Sluijs, F. et al., "An On-chip USB-powered Three-Phase Up/down DC/DC Converter in a Standard 3.3V CMOS Process," *2000 IEEE International Solid-State Circuits Conference,* IEEE, Feb. 9, 2000, pp. 440-441.

Venot, A. et al., "Automated Comparison of Scintigraphic Images," *Journal of Nuclear Medicine,* vol. 27, No. 8, Aug. 1986, pp. 1337-1342.

EPO Patent Abstract for Japanese Patent Publication No. 59-103474, published Jun. 14, 1984, 1 page.

EPO Patent Abstract for Japanese Patent Publication No. 10-079017, published Mar. 24, 1998, 1 page.

EPO Patent Abstract for Japanese Patent Publication No. 10-262071, published Sep. 29, 1998, 1 page.

EPO Patent Abstract for Japanese Patent Publication No. 11-167630, published Jun. 22, 1999, 1 page.

EPO Patent Abstract for Japanese Patent Publication No. 11-252489, published Sep. 17, 1999, 1 page.

Copy of International Search Report issued Jun. 7, 2000, for Appl. No. PCT/US99/29534, 7 pages.

Patent Abstracts of Japan, vol. 1999, No. 11, JP 11-167630, published Jun. 22, 1999.

Copy of Written Opinion issued Aug. 27, 2001, for Appl. No. PCT/US99/29534, 7 pages.

English language translation of Japanese Publication No. JP 11-167630, Japan Patent Office, downloaded on Aug. 1, 2001, from Japanese Patent Office website http://www.ipdl.jpo.go.jp/homepg_e.ipdl, 6 pages.

* cited by examiner

SYSTEM AND METHOD FOR SENDING A PACKET WITH POSITION ADDRESS AND LINE SCAN DATA OVER AN INTERFACE CABLE

This application is a continuation of applcation Ser. No. 09/425,949 now abandoned, filed Oct. 25, 1999, which claims the benefit of priority under 35 U.S.C. § 119(e) of U.S. Provisional Application No. 60/147,498, filed Aug. 9, 1999, both of which are incorporated herein by reference in their entireties.

CROSS-REFERENCE TO RELATED APPLICATIONS

This patent application is potentially related to the following co-pending U.S. utility patent applications:

1. "Calibration and Correction in a Fingerprint Scanner," Ser. No. 09/425,947 by Irving et al., filed concurrently herewith and incorporated in its entirety herein by reference;

2. "Adjustable, Rotatable Finger Guide in a Tenprint Scanner with Movable Prism Platen," Ser. No. 09/422,937 by J. Carver et al., filed Oct. 22, 1999, and incorporated in its entirety herein by reference;

3. "Method, System, and Computer Program Product for a GUI to Fingerprint Scanner Interface," Ser. No. 09/425,958 by C. Martinez et al., filed concurrently herewith and incorporated in its entirety herein by reference; and 4. "Method, System, and Computer Program Product for Control of Platen Movement during a Live Scan," Ser. No. 09/425,888 by G. Barton et al., filed concurrently herewith and incorporated in its entirety herein by reference.

BACKGROUND OF THE INVENTION

1. Field of the Invention

The present invention is generally directed to fingerprint imaging systems.

2. Related Art

Biometrics is a science involving the analysis of biological characteristics. Biometric imaging captures a measurable characteristic of a human being for identity purposes. See, e.g., Gary Roethenbaugh, *Biometrics Explained*, International Computer Security Association, Inc., pp. 1–34, (1998), which is incorporated herein by reference in its entirety.

One type of biometric imaging system is an Automatic Fingerprint Identification System (AFIS). Automatic Fingerprint Identification Systems are used for law enforcement purposes. Law enforcement personnel collect fingerprint images from criminal suspects when they are arrested. Law enforcement personnel also collect fingerprint images from crime scenes. These are known as latent prints.

Tenprint scanners are a common type of AFIS system. Tenprint scanners produce forensic-quality tenprint records of rolled and plain impression fingerprint images. Typical tenprint scanners are usually custom-made consoles. Such custom-made consoles contain built-in equipment, such as a monitor, a keyboard, a pointing device, and at least one processor, for processing and viewing the fingerprint images. The custom-made consoles are expensive.

Custom-made consoles are also burdened with high maintenance costs. When the console malfunctions, the entire system is inoperable. Tenprint scanner system owners must then place a service call to the manufacturer to have a technician come on-site and correct the problem. This can sometimes be a lengthy process. During such maintenance periods, tenprint records cannot be produced.

What is needed is a tenprint scanner system that does not depend on an expensive, built-in console for processing and viewing fingerprint images. What is further needed is a system and method for interfacing a tenprint scanner system to a personal computer (PC) for processing and viewing fingerprint images, wherein the tenprint scanner system is not dependent upon any particular personal computer make or model.

SUMMARY OF THE INVENTION

The present invention solves the above mentioned needs by providing a system and method for interfacing fingerprint images from an identification system to a PC, wherein the PC contains a monitor, a keyboard, a pointing device, and processors for processing and viewing fingerprint images. The identification system is interfaced to the PC via a 1394 interface. The 1394 interface is a high performance serial bus that provides high speed data transfers.

Briefly stated, the present invention is directed to a system and method for sending a packet with a position address and line scan data from a first device over a 1394 interface to a second device. The present invention loads a camera, an illuminator, and a microprocessor with set-up instructions and a start pulse. The camera captures a line-by-line image of an object placed on the surface of a sliding prism. Position data, corresponding to the captured line-by-line image, is logged as the position address. The position address is combined with the line-by-line image to form a packet. The packet is sent to the second device for processing and viewing the image.

The present invention utilizes an off-the-shelf PC having a 1394 interface. The combination of an off-the-shelf PC and a 1394 interface provides a cost-effective way to process and view fingerprint images. The use of the PC also provides flexibility. Instead of having to call the manufacturer of the identification system when the PC malfunctions, a user can simply replace the malfunctioning PC with a back-up PC. The user also has the option of calling any PC service provider to maintain the PC.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
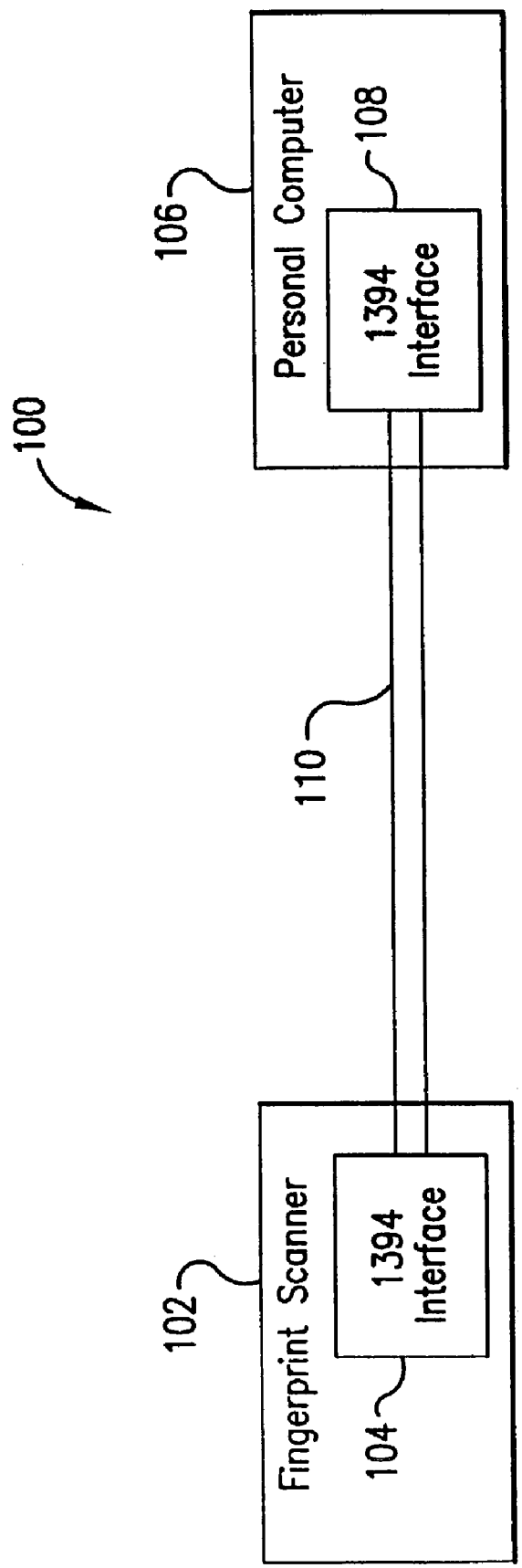
FIG. 1 is a high level block diagram illustrating an Identification System according to an embodiment of the present invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Overview

The present invention is a system and method for sending a packet with address and line scan data over an interface to a personal computer. The interface of the present invention is a 1394 serial bus. The 1394 serial bus interfaces a fingerprint scanner to a personal computer (PC). The personal computer of the present invention can be any commercial off-the-shelf personal computer having a 1394 interface card and a CD ROM.

1394 is an IEEE standard for a high performance serial bus designed to provide high speed data transfers. 1394 is a cost-effective way to share real-time information in data intensive applications, such as cameras, camcorders, VCRs, video disks, etc.

The use of a personal computer and a 1394 serial bus versus a console configuration for AIFS systems reduces overall system cost while providing high-speed data transfers. Current 1394 interfaces support serial transmission speeds up to 400 Mbps. PCs also provide flexibility. Current PCs cost approximately $2,000.00. When the PC malfunctions, a service request merely requires a maintenance call to any PC service provider or a multiple PC back up system, whereby the malfunctioning PC is quickly replaced with a back up PC.

FIG. 1 illustrates a high level block diagram of an Identification System 100 according to the present invention. Identification System 100 comprises a fingerprint scanner 102, a personal computer 106, and an interface cable 110. Interface cable 110 couples fingerprint scanner 102 to personal computer 106.

Fingerprint scanner 102 comprises, inter alia, a first 1394 interface card. Fingerprint scanner 102 captures an image of a fingerprint. The fingerprint image, along with corresponding position data, are combined into a packet. The packet is sent from fingerprint scanner 102 using first interface card 104 to PC 106 via interface cable 110.

Personal computer 106 comprises, inter alia, a second 1394 interface card 108. Second interface card 108 receives the packet for PC 106. PC 106 decodes the packet and forms an image of the fingerprint to be displayed on PC 106's CRT (cathode ray tube (not shown)).

The Identification System

Figure 2:
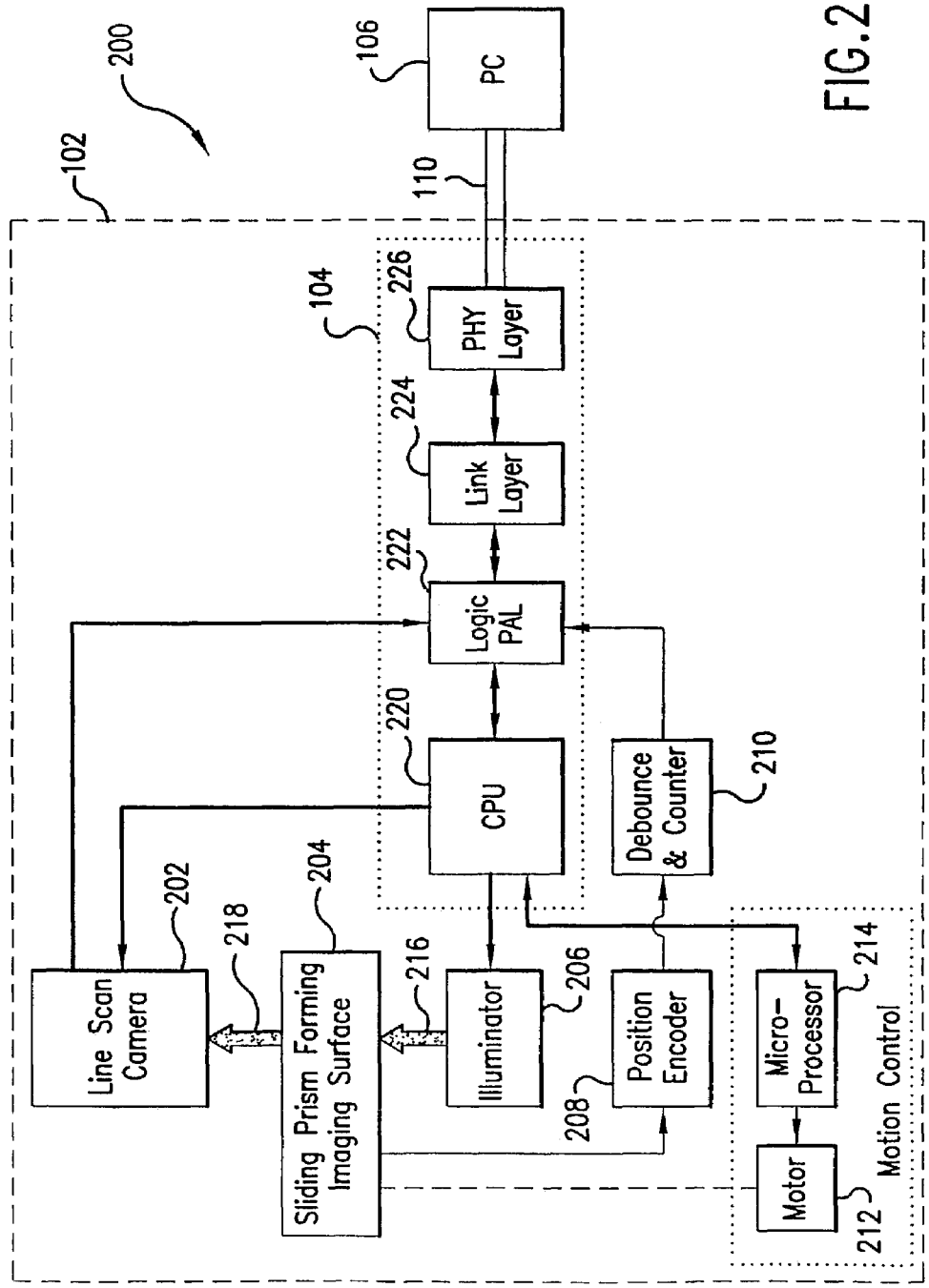
FIG. 2 is a detailed block diagram illustrating an Identification System in which a fingerprint scanner is shown in detail according to an embodiment of the present invention.

FIG. 2 is a diagram of Identification System 100 in which fingerprint scanner 102 is shown in further detail according to an embodiment of the present invention. As previously stated, Identification System 100 shows fingerprint scanner 102 connecting to PC 106 via cable 110. Fingerprint scanner 102 comprises a line scan camera 202, a sliding prism 204, an illuminator 206, a position encoder 208, a debounce and counter circuit 210, a motor 212, a microprocessor 214, and first interface card 104. First interface card 104 comprises a central processing unit (CPU) 220, a logic programmable array logic (PAL) 222, a link layer 224, and a physical (PHY) layer 226.

Camera 202 is coupled to CPU 220 and logic PAL 222. CPU 220 is coupled to illuminator 206, logic PAL 222, and debounce & counter circuit 210. Logic PAL 222 is coupled to link layer 224 and debounce & counter circuit 210. Link layer 224 is coupled to PHY layer 226. Prism 204 is coupled to position encoder 208 and motor 212. Position encoder 208 is coupled to debounce & counter circuit 210. Motor 212 is coupled to microprocessor 214. Microprocessor 214 is coupled to CPU 220 of first interface card 104.

Camera 202 is a low cost linear CMOS camera. One skilled in the relevant art(s) would know that other types of line scan cameras could be used without departing from the scope of the invention. Camera 202 scans the surface of its field of view on a line-by-line basis to capture an image from prism 204. The image capture is represented in FIG. 2 using an arrow 218.

Prism 204 is a moving prism. Prism 204 includes an imaging surface upon which a user places a finger for a rolled print or fingers for a four finger flat print. Both rolled and four finger flat prints are well known to those skilled in the art of fingerprint imaging. Prism 204 is used to slide a user's finger(s) across the field of view of line scan camera 202.

Illuminator 206 comprises a light that shines on prism 204. The illumination of the light is represented in FIG. 2 using an arrow 216.

Position encoder 208 captures the position of prism 204 on a line-by-line basis corresponding to the line-by-line image captured by camera 202. Position encoder 208 outputs the position in the form of incremental ticks or pulses.

Debounce & Counter circuit 210 is used to debounce position encoder 208. Circuit 210 is also used for counting the pulses representative of position from position encoder 208 to obtain an absolute position.

Motor 212 is controlled by microprocessor 214. Motor 212, in conjunction with microprocessor 214, is used to control the velocity of prism 204. Motor 212 is also used to position prism 204 in the correct starting position when the scanning of a user's finger(s) begins.

CPU 220 operates as a controller. CPU 220 controls line scan camera 202, illuminator 206, and microprocessor 214. CPU 220 sends instructions to line scan camera 202, such as exposure time, start pulse to open camera shutter, and other camera settings. CPU 220 triggers illuminator 206 to illuminate its light source to enable camera 202 to capture an image. CPU 220 also signals microprocessor 214 when camera 202 is about to capture an image. At that time, microprocessor 214 sends a signal to motor 212. The signal enables motor 212 to slide prism 204 to its starting position. CPU 220 also communicates with PC 106 via logic PAL 222, link layer 224, PHY layer 226, and cable 110.

Logic PAL 222 includes a 4K byte first-in-first-out (FIFO) chip (not shown). Data output from camera 202 is input into the FIFO of logic PAL 222. Logic PAL 222 is used to combine the line-by-line image data from camera 202 with position data from debounce & counter circuit 210.

Link layer 224 provides data packet delivery service. Link layer 224 formats the combined data into 1394 packets by attaching a header. Two types of data packet delivery between devices are employed by the 1394 interface. They are asynchronous and isochronous.

Asynchronous data delivery is used for control, status, and accuracy-critical data. Asynchronous data delivery provides an acknowledged datagram transfer between devices. A short acknowledgment is returned to the sender for every received packet. The acknowledgment indicates whether or not the packet was received and acted upon without error.

Isochronous transfers provide real-time transfers of video and audio data. Isochronous data delivery is a "just in time" data delivery service. Isochronous data delivery occurs at a cycle of 8,000 times per second.

The bus alternates between isochronous cycles and asynchronous traffic, with isochronous cycles having precedence over asynchronous traffic. Asynchronous data delivery can occur any time the bus is free of isochronous traffic. Typically, isochronous operations may take up to 80% of the available cycle time, leaving at least 20% for asynchronous traffic.

Physical layer 226 or PHY, provides the electrical and mechanical connection between 1394 interface card 104 and 1394 cable 110. PHY 226 also provides initialization and arbitration services to allow all devices on the bus fair access to the bus. PHY 226 also translates the serial bus data stream and signal levels to those required by link layer 224.

Method of Operation for Identification System 100

Figure 3A:
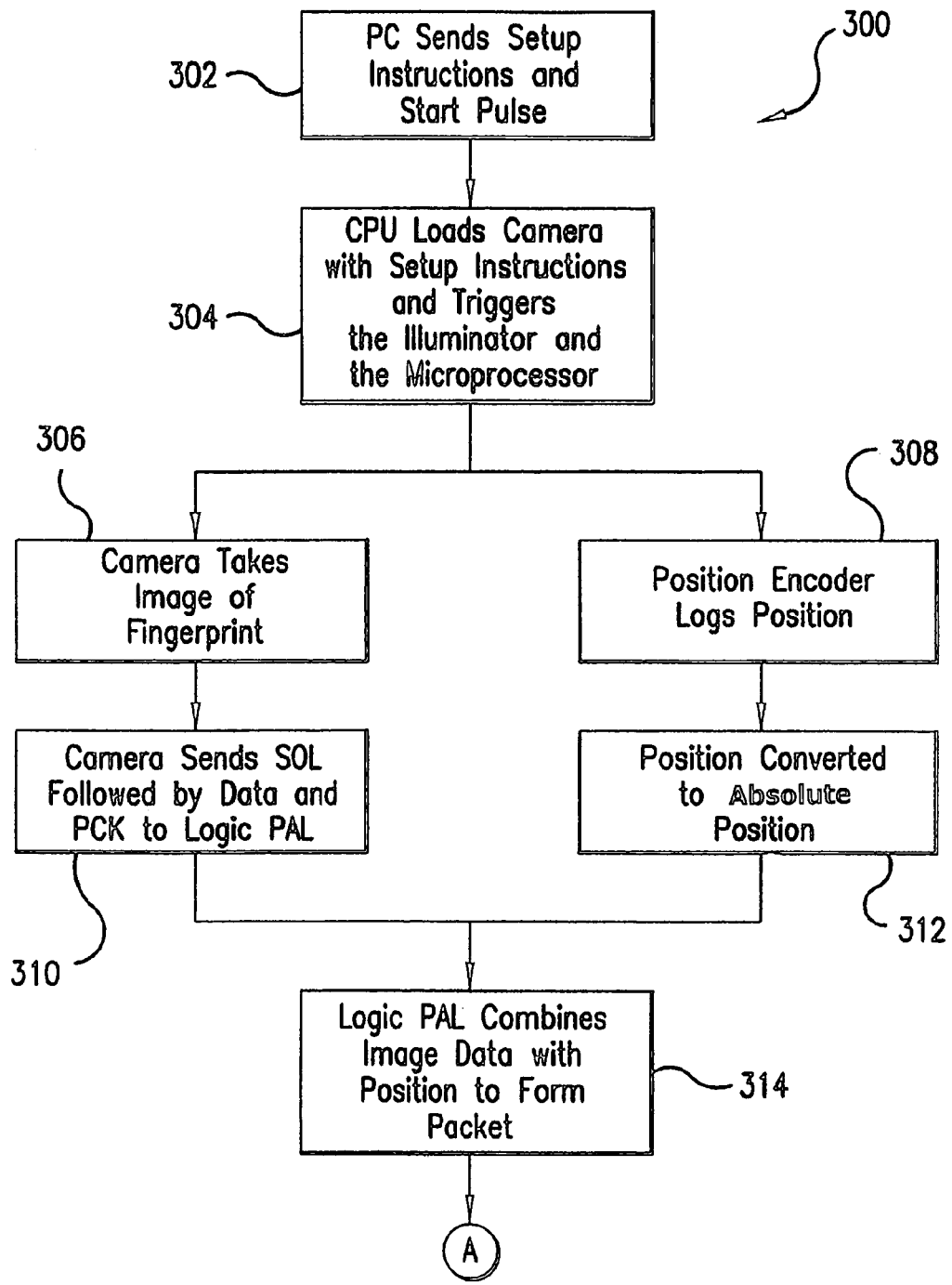
FIGS. 3A and 3B represent a flow diagram illustrating a method of operation for an Identification System according to an embodiment of the present invention.
Figure 3B:
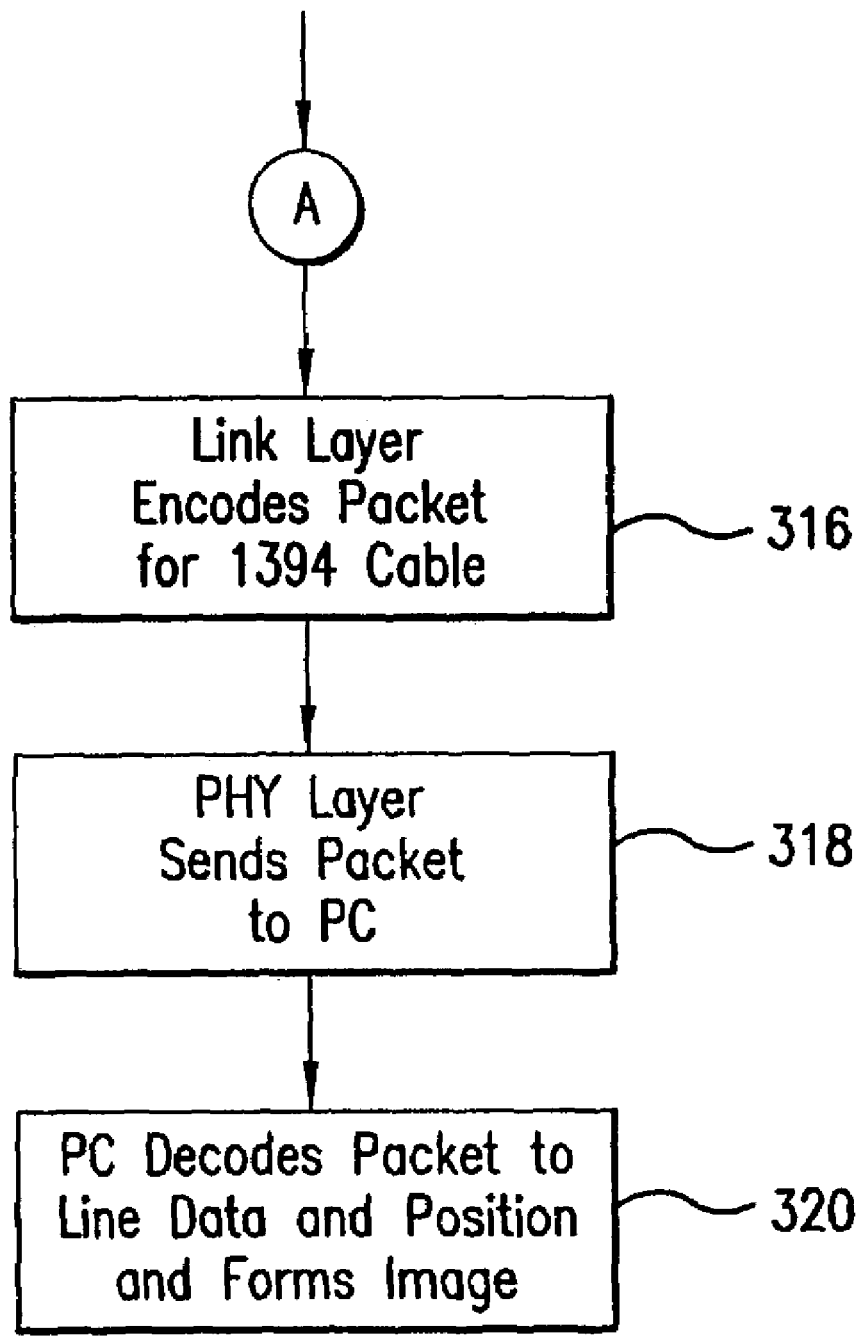

FIGS. 3A and 3B are a flow diagram illustrating a method of operation for an Identification System according to an embodiment of the present invention. The steps of FIGS. 3A and 3B may be implemented in hardware, firmware, software, or a combination thereof.

In FIG. 3A, the method of operation begins with step 302. In step 302, PC 106 sends instructions to Identification System 100, such as camera set-up instructions, start pulse, calibration instructions, etc. These instructions are sent using a Control Status Register (CSR) protocol. The CSR protocol comprises an address, data, status, and, if necessary, a checksum. For example, the packet of data, which is transferred using an asynchronous mode of operation, would indicate that at some particular address, to write this piece of data or to read this piece of data or to check this piece of data and make sure the packet is correct. Control then passes to step 304.

In step 304, CPU 220 loads camera 202 with the set-up instructions and start pulse. CPU 220 also triggers illuminator 206 to shine a light on prism 204. CPU 220 also signals microprocessor 214 to enable motor 212 to move prism 204 to its starting position, if necessary. Control simultaneously passes to steps 306 and 308.

In step 306, after a finger(s) is placed on the surface of prism 204, the light source (shown in FIG. 2 as arrow 216) from illuminator 206 is refracted through prism 204 as camera 202's shutter opens to capture a fingerprint image. Note that prism 204 is placed in the field of view of camera 202 for rolled prints and is moved across the field of view of camera 202 for four finger flat prints. The velocity of prism 204 is controlled by motor 212. Motor 212 prevents a user from sliding prism 204 at a rate of speed that exceeds the recording ability of camera 202. The image captured by camera 202 is shown in FIG. 2 as arrow 218. Once the fingerprint image is captured, control then passes to step 310.

In step 310, camera 202 sends a start of line signal followed by the line-by-line image data to logic PAL 222. Logic PAL 222 temporarily stores the image data (in pixel format) in the FIFO. Camera 202 also sends a pixel clock to logic PAL 222. Control then passes to step 314.

In step 308, position encoder 308 captures raw position data, in the form of incremental ticks or pulses, of prism 204 as the fingerprint image is being captured. Control then passes to step 312.

In step 312, debounce & counter circuit 210 counts the pulses from position encoder 208 to convert the raw position data to an absolute position. The absolute position data is used as a position address when sending the image data to PC 106. Control then passes to step 314.

In step 314, upon receiving the start of line pulse from camera 202, logic PAL 222 retrieves the position address from debounce & counter circuit 210. The position address (which is 16 bits long) is placed in the first two bytes of the packet. Logic PAL 222 then attaches the image data (which is 2750 pixels long) to the packet along side the position data. Thus, a packet is initially equal to:

Packet=(address$_{MSB}$, address$_{LSB}$, P, P, P, ... P)

where:
  MSB=Most Significant Byte;
  LSB=Least Significant Byte; and
  P=Pixel.

Logic PAL 222 then sends the packet to link layer 224. Control then passes to step 316 in FIG. 3B.

In step 316, link layer 224 places appropriate header information onto the packet for 1394 data transmission. The packet is then sent to PHY 226. Control then passes to step 318.

In step 318, PHY 226 sends the packet to PC 318. Control then passes to step 320.

In step 320, PC 106 decodes the packet into position and line data. PC 106 then forms an image, which is displayed on a CRT for the viewer.

CONCLUSION

The present invention is not limited to the embodiment of a fingerprint scanner. The present invention can be used with any system that utilizes a line scan printer and position encoder to send an image to a personal computer. The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A method for communicating image data from a fingerprint scanning device having a camera and a sliding prism to a computer over a 1394 interface, comprising the steps of:
    (a) receiving set-up instructions for the camera and calibration instructions for the fingerprint scanning device from the computer over the 1394 interface;
    (b) loading the camera with the received set-up instructions;
    (c) capturing line-by-line image data associated with an object placed on the sliding prism;
    (d) generating absolute position data corresponding to the line-by-line image data, wherein the absolute position data is referred to as the position address data;

(e) generating a packet including the line-by-line image data and the corresponding position address data; and (f) sending the packet to the computer over the 1394 interface.

2. The method of claim 1, further comprising the steps of:

(g) decoding the packet at the computer to recover the line-by-line image data and the position address data; and (h) forming an image of the object using the line-by-line image data and the position address data.

3. The method of claim 2, further comprising the step of displaying the image on the computer.

4. The method of claim 1, wherein step (e) further comprises the step of encoding the packet for 1394 data transmission.

5. The method of claim 1, wherein step (d) further comprises the step of converting raw position data into the absolute position data.

6. The method of claim 1, wherein step (c) further comprises the step of sending a start of line signal followed by the line-by-line image data.

7. The method of claim 1, wherein step (c) comprises the step of capturing a line-by-line fingerprint image of a finger or fingers placed on the sliding prism.

8. The method of claim 1, wherein step (f) comprises the step of sending the packet to a personal computer (PC).

9. The method of claim 8, further comprising the step of displaying the image on a monitor attached to the computer.

10. The method of claim 1, wherein step (b) further comprises initializing an illuminator and a microprocessor based on the received set-up and calibration instructions.

11. A system for communicating image data from a fingerprint scanning device having a camera and a sliding prism over a 1394 interface to a computer, comprising:

(a) means for receiving set-up instructions for the camera and calibration instructions for the fingerprint scanning device from the computer over the 1394 interface;

(b) means for loading the camera with the received set-up instructions;

(c) means for capturing line-by-line image data associated with an object placed on the sliding prism;

(d) means for generating absolute position data corresponding to the line-by-line image data, wherein the absolute position data is referred to as the position address data;

(e) means for generating a packet including the line-by-line image data and the corresponding position address data; and (f) means for sending the packet to the computer over the 1394 interface.

12. The system of claim 11, further comprising:

(g) means for decoding the packet at the computer to recover the line-by-line image data and the position address data; and (h) means for forming an image of the object using the line-by-line image data and the position address data.

13. The system of claim 12, further comprising means for displaying the image on the computer.

14. The system of claim 12, further comprising means for displaying the image on a monitor attached to the computer.

15. The system of claim 11, wherein said means for generating a packet further comprises means for encoding the packet for 1394 data transmission.

16. The system of claim 11, wherein said means for generating position data further comprises means for converting raw position data into absolute position data.

17. The system of claim 11, wherein said means for capturing further comprises means for sending a start of line signal followed by the line-by-line image data.

18. The system of claim 11, wherein said means for capturing comprises means for capturing line-by-line image data of at least one finger placed on the sliding prism.

19. The system of claim 11, wherein the computer is a personal computer (PC).

20. The system of claim 11, further comprising means for initializing an illuminator and a microprocessor based on the received set-up and calibration instructions.

* * * * *